May 3, 1960     H. L. HARTJE     2,934,979
DOWELLING JIGS

Filed Oct. 15, 1958     2 Sheets-Sheet 1

INVENTOR.
HOWARD L. HARTJE
BY David K. Kilgore
ATTORNEY

May 3, 1960 — H. L. HARTJE — 2,934,979
DOWELLING JIGS

Filed Oct. 15, 1958 — 2 Sheets-Sheet 2

INVENTOR.
HOWARD L. HARTJE
BY David K. Kilgore
ATTORNEY

United States Patent Office 2,934,979
Patented May 3, 1960

2,934,979

DOWELLING JIGS

Howard L. Hartje, St. Thomas, N. Dak.

Application October 15, 1958, Serial No. 767,442

2 Claims. (Cl. 77—62)

This invention relates broadly to hand tools for use in carpentry and cabinet and more particularly to a dowelling jig of the type that is clamped directly to the work and adapted to the use in wood, wood composition and synthetic equivalents.

The principal object of this invention is to provide a dowelling jig for positioning the dowel pin holes in opposed surfaces of material to be joined by dowelling and gluing and which, when adjusted to its work, provides for the precise drilling of said holes in the members to be joined.

Another object of the invention is to provide a dowelling jig that is a unitary structure wherein its drill inserts, while separable from the tool for interchangeability, forms a part of the composite structure.

Another object of the invention is to provide a dowelling jig of the type described having interchangeable work adjusting templets.

These and other objects of the invention will become apparent from the following specification and claims taken in conjunction with the appended drawings and in which drawings, like characters indicate like parts throughout the several views.

Referring to the drawings.

Figure 1:
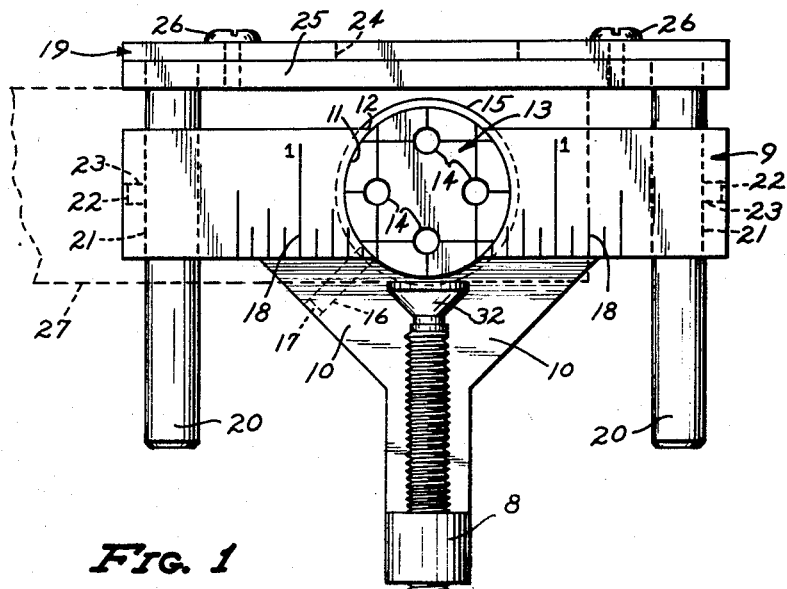
Fig. 1 is a top plan view of the invention described herein.
Figure 2:
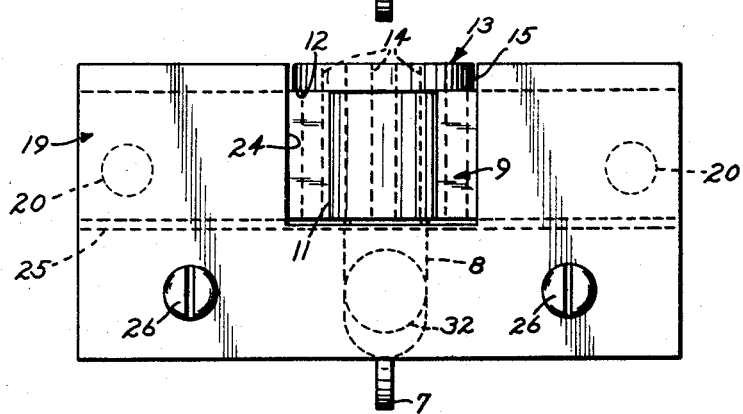
Fig. 2 is a front end elevation of the same.

Referring in detail to the drawings:

The tool as an entirety is in the form of a C-frame comprising in part, a relatively long clamping screw 6 having a finger piece 7. This clamping screw 6 has screw threaded engagement with a longitudinally disposed screw supporting arm 8 having formed integral therewith a transversely disposed turret block 9. A pair of stiffening webs 10 are formed integral with the screw supporting arms 8 and the turret block 9 to impart a high degree of rigidity to the said C-frame assembly. A vertically disposed cylindrical bore 11 is formed at the longitudinal and transverse center of the C-frame assembly said bore having a shoulder 12 in its upper end portion for a purpose that will be presently described.

The C-frame assembly as thus far described affords a mounting station for a turret type drill insert 13 having multiple and integral drill bushings 14. The drill insert 13 is obviously cylindrical and is provided at its upper end portion with a relatively narrow annular flange 15 that seats on the shoulder 12 formed in the cylindrical bore 11 in the C-frame assembly. It will be understood that the drill insert 13 and its flange 15 at the upper surface thereof when positioned for work in the bore 11 is flush with the upper surface of the turret block 9 and is machined to a close working fit with the said bore 11 and held locked against rotation about its vertical axis and endwise movements by an Allen set screw 16 which has threaded engagement with a threaded bore 17 that extends diagonally through one of the webs 10 and into communication with the bore 11 where said Allen screw 16 will impinge the drill insert 13 seated in the bore 11.

The numeral 18 indicates alignment and positioning graduations on the upper surface of the turret block 9 and the numerals associated therewith are of an entirely arbitrary nature.

The C-frame as an entirety affords a mount for a templet carrier member which comprises a horizontally disposed clamping block 19 having a pair of relatively heavy rearwardly projecting transversely spaced guide rods 20. The guide rods 20 are machined to a close working fit with a pair of transversely spaced bores 21 longitudinally disposed in the outer end portions of the turret block 9 and in which, the rods 20 have endwise movement relative to the C-frame. The clamping block 19 is held locked against endwise movement by means of a pair of Allen set screws 22 which have threaded engagement with bores 23 in each end portion of the turret block 9. When said set screws are tightened the inner end portion of each thereof will impinge the respective guide rods 20 in the bores 23 and thus hold the templet carrier against endwise movement.

It is important to note that the upper edge portion of the clamping block 19 of the templet carrier is relieved at its longitudinal center, see numeral 23, to afford clearance for the drill inserts 13 when the turret block 9 and the clamping block 19 are moved into endwise abutting engagement.

The templet 25 is interchangeably secured to the clamping block 19 by means of a pair of spaced headed bolts 26 that extend through the clamping block 19 into screw threaded engagement with the templet 25.

Figure 3:
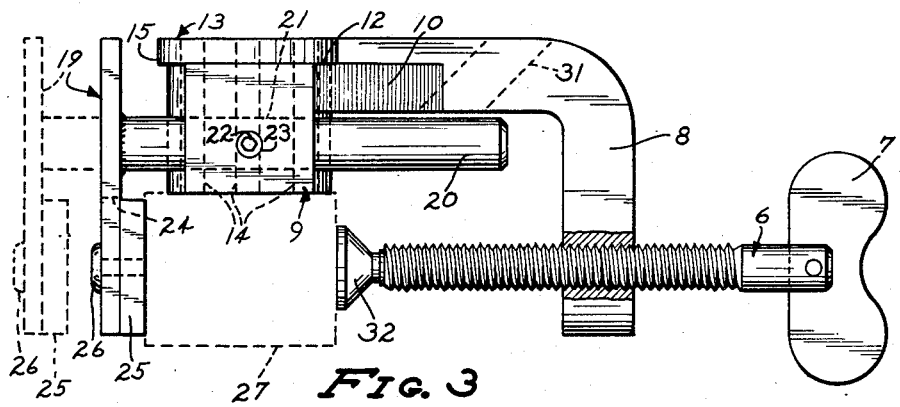
Fig. 3 is a side elevational view of the invention partly in section and showing the invention in use.
Figure 4:
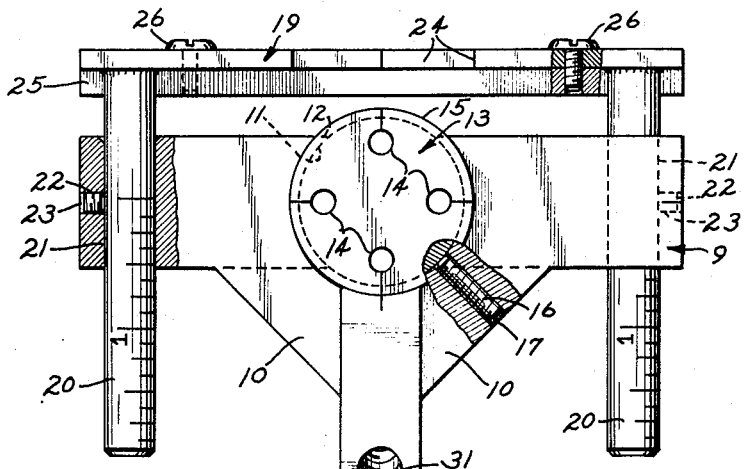
Fig. 4 is a bottom plan view of Fig. 1, also partly in section.

As best illustrated in Figs. 1 and 3, a piece of work 27 is shown by means of broken lines clamped in position in the tool for boring the dowel pin holes in a simple corner butt joint and it will be obvious that when the tool is once so adjusted for the drilling of said holes it is only necessary to clamp the material surfaces to be joined in exactly the same manner and position according to the locked templet carrier and the graduations 18 on the turret block 9 to achieve perfect alignment of the respective dowel pin holes. It will be understood that the turret drill insert 13 will also be rotated about its vertical axis to properly and precisely center the drill insert bushings on the material to be worked and thence locked in position.

Figure 5:
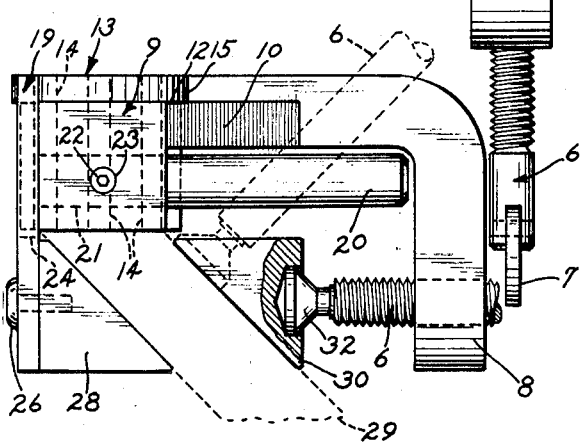
Fig. 5 is a fragmentary view of the invention partly in section and illustrating a modified form of the tool.

Reference is now made to the modification shown in Fig. 5 wherein the templet 25 has been replaced on the clamping block 19 by an angular templet 28 for holding a piece of work 29 positioned for drilling the dowel pin holes for a simple miter butt joint. As shown by means of full lines in Fig. 5, an angular insert 30 is applied to the inner end portion of the clamping screw 6 the said work 29 being held positioned between the opposing surfaces of the members 25 and 30.

In drilling the dowel pin holes for a miter joint of this type it is also possible to clamp the work 29 in position by eliminating the angular insert 30 and by inserting the clamping screw 6 into a secondary threaded bore 31 formed in the screw supporting arm 8 said bore being at 45 degrees to the perpendicular working surface of the clamping block as shown in Figs. 1 through 4. Obviously, the clamp screw fitting 32 on the outer end of the clamping screw 6 is necessarily detachable therefrom to permit the complete removal thereof from its horizontal bore and into threaded engagement with the angular threaded bore 31 and thence be replaced when the advancing clamping screw 6 clears the underside of the supporting arm 8 it will thus be seen that this modification provides for holding the work 29 between the fitting 32 of the screw 6 and the angular insert 30.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. A dowelling jig of the class described, comprising in combination, an elongated clamping screw constructed and arranged to hold an object to be drilled, a longitudinally disposed C-frame having screw threaded engagement with the clamping screw, a turret block integral with the C-frame and transversely disposed thereto, a turret drill insert having a plurality of integral drill bushings, said turret drill insert being mounted in the turret block to rotate about its vertical axis and a set screw having screw threaded engagement with said turret block and the turret drill insert via a threaded bore whereby the turret drill insert may be locked at a predetermined position, a pair of longitudinally disposed bores in the outer end portions of the turret block, a templet carrier having a transversely disposed clamping block and a pair of laterally spaced guide rods constructed and arranged for endwise movements in the bores of said turret block, a set screw having engagement with each guide rod via a threaded bore in each end portion of said turret block whereby each guide rod of the templet carrier may be locked in predetermined position by the turning of said set screws into engagement with each of said guide rods, an interchangeable templet mounted on the inner face of the clamping block to afford an angular base of resistance for a piece of work advanced to the working surface of the templet by an angular fitting detachably secured to the outer end portion of the clamping screw.

2. The structure defined in claim 1 further including a secondary bore angular in the C-frame said bore having screw threaded engagement with the clamping screw, an angular templet detachably secured to the clamping block, said clamping screw and said templet having working surfaces at 45 degrees to the perpendicular plane of the working surface of said clamping block to position and secure a piece of work for the drilling of dowell pin holes for miter butt joints.

References Cited in the file of this patent

UNITED STATES PATENTS

| | | |
|---|---|---|
| 1,210,942 | Jones | Jan. 2, 1917 |
| 2,522,400 | Polkosnik | Sept. 12, 1950 |
| 2,641,147 | Sulc | June 9, 1953 |